United States Patent
Engel et al.

(10) Patent No.: US 11,101,671 B2
(45) Date of Patent: Aug. 24, 2021

(54) ELECTRICAL VEHICLE SYSTEM TO DISCHARGE CAPACITORS

(71) Applicant: DELPHI AUTOMOTIVE SYSTEMS LUXEMBOURG S.A., Stuttgart (DE)

(72) Inventors: Joseph A. Engel, Differdange (LU); Scott Gerber, Kokomo, IN (US); Alexandre M. Reis, Kokomo, IN (US)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/234,764

(22) Filed: Dec. 28, 2018

(65) Prior Publication Data

US 2020/0212690 A1 Jul. 2, 2020

(51) Int. Cl.
*H02J 7/00* (2006.01)
*B60L 1/04* (2006.01)
*B60R 16/033* (2006.01)
*H05B 1/02* (2006.01)
*H02J 7/34* (2006.01)

(52) U.S. Cl.
CPC .............. *H02J 7/0029* (2013.01); *B60L 1/04* (2013.01); *B60R 16/033* (2013.01); *H02J 7/0068* (2013.01); *H05B 1/0236* (2013.01); *H02J 7/345* (2013.01)

(58) Field of Classification Search
CPC ........ H02J 7/0029; H02J 7/0068; H02J 7/345; H05B 1/0236; B60L 1/04; B60R 16/033
See application file for complete search history.

(56) References Cited

U.S. PATENT DOCUMENTS

| | | | |
|---|---|---|---|
| 6,072,301 A * | 6/2000 | Ashtiani | H01M 10/625 320/128 |
| 8,497,031 B2 | 7/2013 | Reischmann et al. | |
| 2009/0021221 A1 | 1/2009 | Krauer et al. | |
| 2009/0139781 A1 | 6/2009 | Straubel | |
| 2009/0315518 A1 | 12/2009 | Soma et al. | |
| 2011/0241581 A1* | 10/2011 | Flock | B60L 3/04 318/400.3 |
| 2011/0267004 A1 | 11/2011 | Krauer et al. | |
| 2012/0049794 A1 | 3/2012 | Han et al. | |
| 2018/0334045 A1 | 11/2018 | Bendani et al. | |

FOREIGN PATENT DOCUMENTS

| | | |
|---|---|---|
| DE | 102014218775 A1 | 3/2016 |
| FR | 3036864 A1 | 12/2016 |
| WO | 2014024708 A1 | 2/2014 |

\* cited by examiner

*Primary Examiner* — Hal Kaplan
*Assistant Examiner* — Thai H Tran
(74) *Attorney, Agent, or Firm* — Leydig, Voit & Mayer, Ltd.

(57) ABSTRACT

A vehicle electrical system including a battery, the terminals of which supply positive and negative power rails, the battery being connected to one or more vehicle devices to supply power or charging thereto. The devices include capacitors. The system also includes at least one heating device and a switch to allow capacitor discharge to flow through the heating device.

7 Claims, 2 Drawing Sheets

ELECTRICAL VEHICLE SYSTEM TO DISCHARGE CAPACITORS

TECHNICAL FIELD

This invention relates to vehicle systems and has particular but non-exclusive application to electrically powered vehicles. In particular it relates to a method of discharging capacitors of a vehicle system.

BACKGROUND OF THE INVENTION

Vehicle electrical systems such as aircon, traction, and other systems often include bulky and high capacity capacitors. In certain circumstances these need to be discharged safely. Currently, additional circuitry/components are required to do this. This adds to cost and weight. It is an object of the invention to reduce costs and the need for expensive additional circuitry.

SUMMARY OF THE INVENTION

In one aspect of the invention is provided A vehicle electrical system including a battery, the terminals of which supply positive and negative power rails, said battery being connected to one or more vehicle devices to supply power or charging thereto, said devices comprising or including capacitors, and further including at least one heating device, and including means to allow capacitor discharge to flow through the heating resistance.

Said capacitor may be the bulk capacitors of an electrical vehicle.

Said heater may be a (main) battery or bulk capacitor heater.

Said heating resistance may be connected at each end to said power rails, and where one of the end of the heating resistance is connected to the respective power rail via a switch means, adapted to be switched between a connected state where said capacitors can discharge by allowing current to flow through the heating resistance, and a disconnected state.

Said switch means may be part of the heater controller.

Said switching means may be controlled by an input from an Electronic Control Unit (ECU).

Said capacitance may be a bulk capacitor of an electric vehicle, located in series or directly with a switching device, and being electrically connected between said power rails, and where means to allow said capacitor to discharge comprises switching means connected between a point between capacitor and switching device, and a terminal of the heating resistance.

The system may include a diode in series with said switching means electrically connected between said point and said terminal.

BRIEF DESCRIPTION OF THE DRAWINGS

The present invention is now described by way of example with reference to the accompanying drawings in which.

DESCRIPTION OF THE PREFERRED EMBODIMENTS

Figure 1:
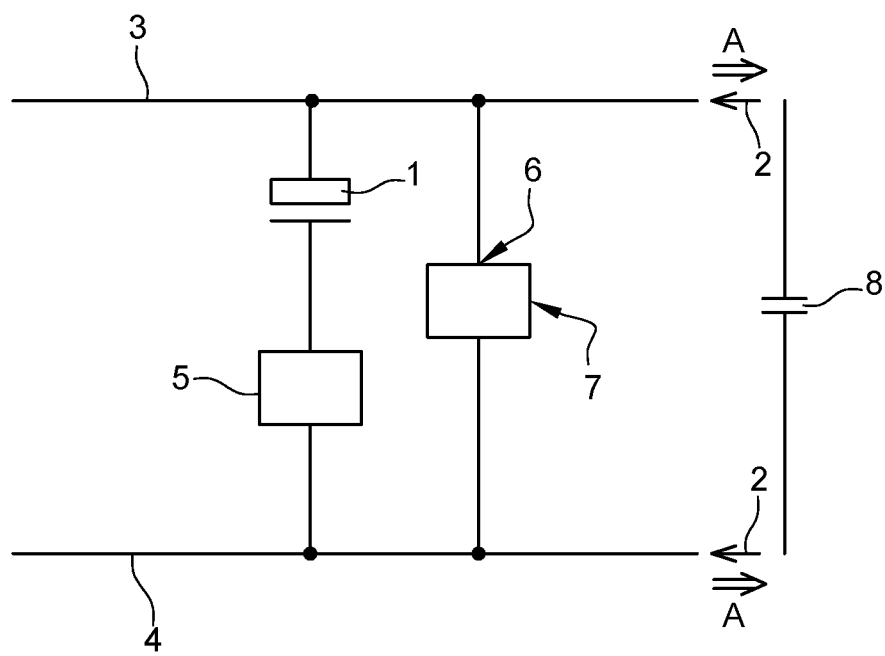
FIG. 1 shows a prior art system to discharge capacitors.

FIG. 1 shows a schematic circuit diagram showing two lines or rails 3 and 4 which are connected to either terminal of the vehicle battery. So one rail e.g. the top rail 3 is the positive rail and one rail 4 e.g. the bottom, is the negative rail. The positive rail 3 and the negative rail 4 supply vehicle systems and components further (not shown) on the right hand side of the figure as indicated by the arrows A. These systems and components may be e.g. aircon, traction, etc. and may include a capacitance or capacitor(s) 8 which need discharging.

In the case of electrically powered vehicles, there is typically included a bulk capacitor 1 which has connections between the battery voltage, i.e. spans the positive rail 3 and negative rail 4. In series with the capacitor is a switching device 5 which may comprise e.g. of an IGBT and relay. This allows control of charging/discharge of the bulk capacitor 1.

Vehicle systems such as aircon and traction systems often include e.g. large capacitors which in certain circumstances need to be discharged quickly e.g. for safety purposes during critical situations e.g. if the vehicle system indicates an imminent or potentially dangerous situation. So to recap, one or more (e.g. high voltage) capacitors represented by 8 needs to be brought to a safe level and this can be done by a control discharge command from the ECU (Electronic/Engine Control Unit).

Both the discharge of the bulk capacitor 1 and/or the discharge of other capacitors 8 are provided by a relatively expensive device 6 which provides a discharge function from the capacitors 8 (allowing correct discharge path as shown by the arrows 2) and is controlled by a discharge signal 7.

So in other words, the present arrangement provides the capability to control the discharge in the bulk capacitor 1 and any further capacitors 8 located along the positive rail 3 and the negative rail 4 in a way that device 6 limits the instantaneous current and yet drives down the voltage fast enough to achieve a safe state within a given time (<60V in <2 sec after trigger of discharge function by discharge signal 7).

The safety discharge device 6 requires spreading of heat and is a cost adder and space adder. The switches involved are dedicated for only this purpose and since sleeping faults must be detected, the switches need to be activated for testing. This is a risk in the sense that the system can overheat in the event of a defect. This complexity is currently accepted by the market.

According to aspects of the invention, use is made of a heater resistance in a vehicle heater device to also discharge capacitors 8. The vehicle heater device may be for example the heater which is used to warm up the capacitor bank and/or main battery but may be any heater. The heater device is also used according to the examples of the invention to discharge capacitors. Preferably with electric vehicles the heater used to prewarm the capacitor bank or main battery is used. In an aspect of the invention the heater resistance is used to take the load when discharging the capacitor. So effectively, the heater resistance is used for two functions.

Figure 2:
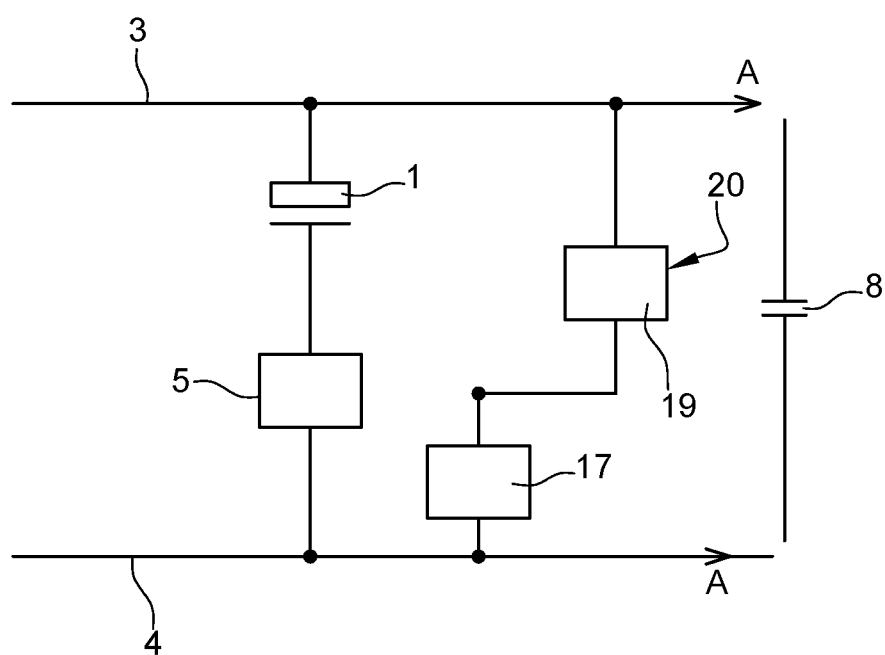
FIG. 2 shows a system according to one example.

FIG. 2 shows circuitry according to one aspect. It is similar to FIG. 1 and like components have the same reference numerals. Again, the figure shows two lines or rails 3, 4, which are connected to either terminal of the vehicle battery. The top rail 3 is the positive rail and the bottom rail 4 is the negative rail. The positive rail 3 and the negative rail 4 also supply vehicle systems and components further (as indicated by the arrows A) which include capacitors represented by capacitor 8. In electrical vehicles, a bulk capacitor 1 is provided as shown which has connections between the battery voltage, i.e. spans the positive and negative rail. In series with the capacitor 1 is a switching device 5 which may comprise e.g. of an IGBT and relay. This allows control of charging of the capacitor 1. It is to be noted that for the purpose of the example of invention where capacitors 8 are discharged, bulk capacitor 1 and switching device 5, are not essential features.

Reference numeral 17 represent the heating resistance of a heating device e.g. to heat the bulk capacitors or main battery and is controlled by heater control stage 19. The heater device 17 and heater control stage 19 are connected to the battery/power supply e.g. in series. The heater control stage 19 has an input 20 which is a discharge control similar to the discharge signal 7 with reference to FIG. 1 and which may come from the ECU and is a command to discharge capacitors 8 to bring to e.g. safe levels in an e.g. emergency.

So, in aspects of the invention the heater resistance is used to also discharge the capacitors 8—thus by appropriate switching and control in heater control stage 19, the heater device 17 has additional functionality. The heater resistance as it is designed to take large current for heating purpose can discharge a lot of current in a small timespan and in this way the need for the extra device 6 is eliminated saving cost of the component. The slow discharge path is formed by the heater control stage 19 and the heater device 17. During this time, the heater control stage 19 is adapted to provide and control discharge from capacitors.

Figure 3:
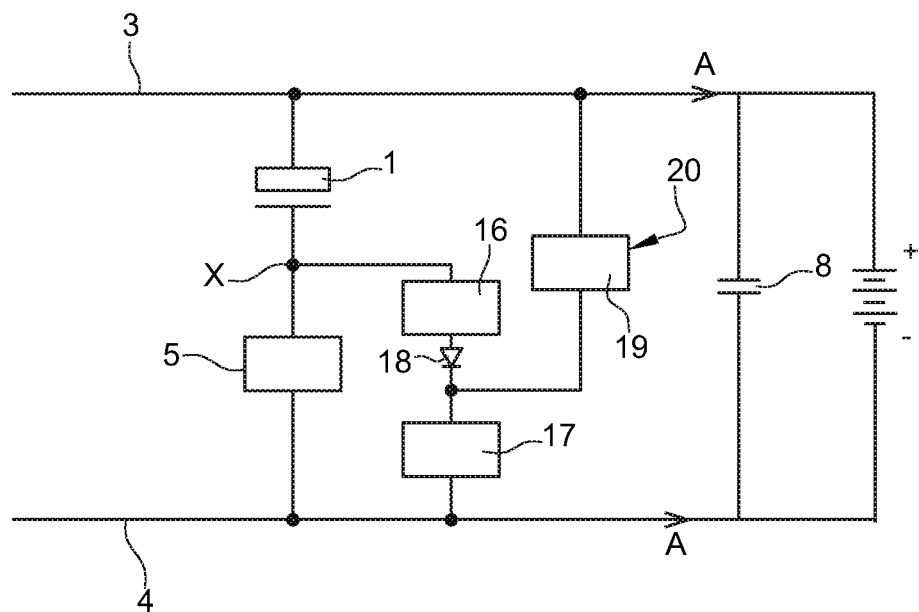
FIG. 3 shows a system according to a further refined example.

The heater device 17 and heater control stage 19 can be tested as part of the heater function or be tested to detect sleeping faults. The robustness of the heater device 17 is way superior to the discharge circuits currently on the market. Since the heater device 17 is embedded in the system it is capable of the required reliability that is not achievable with remotely connected devices FIG. 3 shows a further enhanced embodiment which can be provided for an electrical vehicle with a bulk capacitor. It is similar to FIG. 2 but also includes a connection from a point (marked X in the figure between one side of the charger/bulk capacitor 1 and the switching device 5), via a switching device 16 with diode 18, to the heater device 17. This provides the capability to take power from positive rail 3 and negative rail 4 to discharge the bulk capacitor 1 in the charger (in addition to along the positive rail 3 and negative rail 4) in the vehicle via the heater control stage 19. Again, appropriate control signal (e.g. form the ECU) can be used to control the heater (via switching) to allow discharge of the bulk capacitor 1.

Of course, this arrangement may be used to control discharge from the bulk capacitor 1 and or the other (system) capacitors 8.

The complexity and failure modes, the cost and the dynamic behavior are improved. The robust heater is reused to save the presently used discharge solutions.

We claim:

1. A vehicle electrical system comprising:
a positive power rail connectable to a positive terminal of a battery;
a negative power rail connectable to a negative terminal of the battery;
one or more vehicle devices connected to said positive power rail and said negative power rail such that said one or more vehicle devices is supplied with power, or is charged by, said battery, wherein said one or more vehicle devices comprises capacitors;
a heating device; and
means to allow capacitor discharge from said capacitors to flow through the heating device;
wherein said heating device is a battery heater or a bulk capacitor heater.

2. The system as claimed in claim 1, wherein said capacitors are bulk capacitors of an electrical vehicle.

3. The system as claimed in claim 1, where said heating device is connected at a first end to one of said positive power rail and said negative power rail, and where a second end of said heating device is connected to the other of said positive power rail and said negative power rail via a switch means which is adapted to be switched between a connected state where said capacitors can discharge by allowing current to flow through the heating device, and a disconnected state.

4. The system as claimed in claim 3, wherein said switch means is part of a heater controller which controls said heating device.

5. The system as claimed in claim 3, where said switch means is controlled by an input from an Electronic Control Unit (ECU).

6. The system as claimed in claim 1, where said capacitors are a bulk capacitor of an electric vehicle, located in series or directly with a switching device, and being electrically connected between said positive power rail and said negative power rail, and where said means to allow said capacitors to discharge comprises switching means connected between a point between said bulk capacitor and said switching device, and one end of the heating device.

7. The system as claimed in claim 6 including a diode in series with said switching means electrically connected between said point and said one end of said heating device.

* * * * *